United States Patent [19]

Young

[11] B 3,928,233

[45] *Dec. 23, 1975

[54] HYDROGENATIVE CONVERSION CATALYSTS

[75] Inventor: Dean Arthur Young, Yorba Linda, Calif.

[73] Assignee: Union Oil Company of California, Los Angeles, Calif.

[ * ] Notice: The portion of the term of this patent subsequent to July 13, 1988, has been disclaimed.

[22] Filed: Nov. 2, 1972

[21] Appl. No.: 302,998

[44] Published under the Trial Voluntary Protest Program on January 28, 1975 as document no. B 302,998.

Related U.S. Application Data

[60] Continuation-in-part of Ser. No. 281,116, Aug. 16, 1972, which is a division of Ser. No. 869,389, Oct. 24, 1969, abandoned, which is a continuation-in-part of Ser. No. 669,288, Sept. 20, 1967, abandoned.

[52] U.S. Cl. ............................................. 252/455 Z
[51] Int. Cl.$^2$ ........................................ B01J 11/40
[58] Field of Search ................ 252/455 Z, 458, 437

[56] References Cited
UNITED STATES PATENTS

| | | | |
|---|---|---|---|
| 3,210,265 | 10/1965 | Garwood | 252/455 Z |
| 3,367,885 | 2/1968 | Rabo et al. | 252/455 Z |
| 3,471,410 | 10/1969 | Oleck et al. | 252/455 Z |
| 3,592,760 | 7/1971 | Young | 252/455 Z |

*Primary Examiner*—C. Dees
*Attorney, Agent, or Firm*—Richard R. Hartman; Lannas S. Henderson; Dean Sandford

[57] ABSTRACT

Improved hydrogenative conversion catalysts include one or more crystalline aluminosilicate zeolites, a hydrogenation component containing tungsten or molybdenum, and a Group IV metal stabilizing component containing titanium or zirconium. These compositions exhibit superior stability and hydrocracking, hydrofining and hydrogenation activity.

5 Claims, No Drawings

HYDROGENATIVE CONVERSION CATALYSTS

This application is a continuation-in-part of copending application Ser. No. 281,116 filed Aug. 16, 1972 which was a division of Ser. No. 869,389 filed Oct. 24, 1969, now abandoned, which in turn was a continuation-in-part of Ser. No. 669,288 filed Sept. 20, 1967, now abandoned.

The Group VI-B metals and compounds thereof have found wide application as catalytic components particularly for hydrogenative hydrocarbon conversions. These components are usually combined with amorphous oxides such as alumina, silica or zirconia. Their utility for hydrogenation, dehydrogenation, hydrocracking, desulfurization and denitrogenation has been demonstrated. More recently, considerable interest has developed in the use of crystalline zeolites as catalyst supports, particularly for hydrocracking catalysts. In most instances the zeolites have proved to be more active catalyst components.

However, I have observed that attempts to combine molybdenum or tungsten with zeolites by conventional methods are not highly successful. For example, previous investigators have repeatedly emphasized the desirability, if not the necessity, of intimately dispersing hydrogenation components throughout the inner adsorption area of the zeolite. Teachings of this nature are illustrated by U.S. Pat. No. 3,236,761. I have now discovered that the use of these procedures to produce zeolite catalysts containing molybdenum or tungsten hydrogenation components does not result in either the most active or most stable composition. It appears that the Group VI components deteriorate the quality of the zeolite by some mechanism that is not fully understood. It is also conceivable that the zeolite itself in some way diminishes the hydrogenation activity of the Group VI component. This effect might occur for example when the Group VI component is deposited in the interior of the zeolite and thereby isolated from larger molecules in the hydrocarbon feed.

It is therefore one object of this invention to provide an improved hydrocarbon conversion catalyst. It is another object to provide an improved catalyst for hydrogenating, dehydrogenating, oxidizing, hydrocracking and hydrofining hydrocarbons. Another object is the provision of a method for producing improved hydrocarbon conversion catalysts. Improved conversion methods employing these catalysts are also envisioned.

In accordance with one embodiment an improved catalyst includes a crystalline aluminosilicate zeolite, a Group VI metal component selected from the metals, oxides and sulfides of tungsten and molybdenum and a stabilizing amount of a Group IV component containing titanium and/or zirconium. It is presently believed that the intimate association of the Group VI and Group IV components in the presence of the aluminosilicate prevents either destruction of the zeolite by the Group VI component or inhibition of the Group VI component activity due to some physical or chemical characteristic of the zeolite. The improvements observed upon the addition of the Group IV component to the combination of the zeolite and Group VI-B component are particularly notable in catalysts which are subjected to elevated temperatures either during preparation or in the process environment. These improvements are particularly noticeable when the catalyst is heated to temperatures in excess of about 800°F and are especially apparent at temperatures above about 1,000°F.

Essentially any natural or synthetic crystalline aluminosilicate zeolites can be used in these catalysts. A wide variety of zeolites are known. Illustrative synthetic zeolites include zeolite X, U.S. Pat. No. 2,882,224; zeolite Y, U.S. Pat. No. 3,130,007; zeolite A, U.S. Pat. No. 2,882,243; zeolite L, Belgium Pat. No. 575,117; zeolite T, U.S. Pat. No. 2,950,952; zeolite O, U.S. Pat. No. 3,140,252; zeolite KG, U.S. Pat. No. 3,056,654; zeolite Omega, Canadian Pat. No. 817,915; synthetic mordenite, the so-called layered aluminosilicates such as those desribed in U.S. Pat. No. 3,252,757 and 3,252,889, and the like. Naturally occurring crystalline zeolites are also generally well known and include erionite, levynite, phillipsite, datolite, chabazite, and numerous others.

Several of these zeolites are more widely employed as catalysts due to certain physical or chemical characteristics such as pore size, pore size distribution, ion exchange capacity and ability to catalyze acid catalyzed reactions. Accordingly, the use of several of these compositions is preferred. These include the synthetic faujasite-type zeolites such as zeolites X and Y, and the exchanged and heat-treated modifications thereof such as the so-called ultrastable zeolites described in U.S. Pat. No. 3,293,192 and U.S. Pat. No. 3,449,070. Other zeolites falling within this group include zeolites A, L, T, Omega, mordenite and the so-called layered aluminosilicates referred to above.

Obviously, treated forms of these zeolites can also be used. Such treatments include acid extraction or milder acid treatment, ion exchange, calcination, steaming, and the like. However, the presently preferred zeolites are those which have been exchanged or otherwise converted to the ammonium, hydrogen or iron group metal cation form. Preferred iron group metal cations include nickel and cobalt. Reduced alkali metal contents on the order of less than about 2 percent, and preferably less than about 1 weight percent of the corresponding alkali metal oxide are also preferred.

These compositions also usually contain one or more amorphous refractory oxides which serve as extenders, binders and/ or cocatalysts. Although a variety of such amorphous oxides are generally well known, several such as silica, alumina, zirconia and magnesia are more widely used in combination with crystalline aluminosilicates. Silica and alumina or combinations thereof are particularly preferred for use in these compositions especially when the Group IV component or a portion thereof is combined with the amorphous oxide. However, essentially any amorphous oxide which does not interfere with the catalytic or stabilizing properties of the Group VI or Group IV components can be employed in these compositions. This is particularly true when the Group IV component is deposited primarily on the zeolite.

The finished catalyst usually contains at least about 5 weight percent and generally in exccess of about 15 weight percent of the amorphous oxide. However, in some processes such as midbarrel hydrocracking where higher selectivity to higher boiling products is desired, the catalyst may contain in excess of about 50 weight percent of one or more amorphous oxides based on a combined dry weight of the oxide and zeolite.

The catalyst will usually contain more than about 5 and preferably about 10 to about 40 weight percent of the Group VI metal determined as a corresponding oxide. This metal can be either molybdenum or tungsten or a combination of both, molybdenum being particularly preferred. The metals can be present in either elemental form or as the oxides or sulfides. However, in most instances it is preferable to calcine the composition to convert the Group VI metal to the oxide and then sulfide the product by reaction with a sulfur donor such as hydrogen sulfide mercaptans or carbon bisulfide. Thus, for hydrogenative conversions it is presently preferred that the catalyst contain at least a major portion of the Group VI-B metal as the sulfide.

The molybdenum or tungsten can be combined either with the refractory oxide or the zeolite or a combination of the two by essentially any procedure including impregnation, in situ precipitation, comulling, or the like. However, the advantages of this invention are believed to be most apparent when the hydrogenative component is added to the zeolite or a combination of zeolite and refractory oxide.

Either soluble or insoluble Group VI metal compounds can be used for comulling. Illustrative insoluble compounds or compounds that can be rendered insoluble by controlling solution pH, are molybdic oxide, tungstic oxide, tungstic acid, molybdic acid, ammonium cerium dodecamolybdate, and the like. Illustrative water soluble compounds include ammonium molybdate, ammonium heptamolybdate, ammonium paratungstate, ammonium sulfotungstate, ammonium phosphomolybdate, nickel or cobalt phosphomolybdates, and the alkali and alkaline earth metal analogs thereof, and the like. These water soluble compounds can also be employed to impregnate the zeolite and/or refractory oxide with the Group VI compound simply by contacting the support with a solution of the selected compound or compounds. Solutions of Group VI compounds in inert organic solvents can also be used to impregnate the catalyst support. Thus any combination of organic solvent and Group VI compound soluble therein can be used. Illustrative solvents include normally liquid hydrocarbons preferably having up to about 20 carbon atoms, halogenated and/or oxidized hydrocarbons having similar carbon numbers including carbon tetrachloride, bromoform, chlorohexanes, mono- and polyhydric alcohols, ketones such as acetone, ethers such as diethylether, sulfides such as dimethylsulfide, thiols, sulfoxides, and the like. Compounds soluble on one or more of these solvents include molybdenum pentachloride, tungsten pentabromide, molybdenum and tungsten carbonyls, molybdenum dichloride, oxidichloride and oxichloride acid, and tungsten hexachloride, oxytetrachloride, and metatungstic acid.

Another alternative involves forming an insoluble or undissolved Group VI-B metal compound in the presence of the zeolite and/or amorphous oxide. For example, the support can be slurried in the solution of ammonium heptamolybdate, ammonium tungstate or other soluble Group VI compound which is then acidified to precipitate molybdic or tungstic acid. Insoluble heteropoly compounds can also be formed in the slurry. For example, ammonium ion can be added to a solution of phosphomolybdic to precipitate ammonium phosphomolybdate. Similarly insoluble Group VI components can be prepared by slurrying the zeolite oxide with a soluble Group VI compound such as ammonium tungstate or molybdate followed by the addition of the Group IV metal component and acidification to a pH below about 6, preferably below the isoelectric point of the Group IV metal, to maintain the titanium or zirconium as the hydrous oxide. This procedure is discussed in more detail in my copending application Ser. No. 209,440 filed Dec. 17, 1971 and incorporated herein by reference. All of these Group VI metal compounds are readily convertible to the corresponding oxide upon calcination in an oxidizing atmosphere. The oxide can then be sulfided by conventional procedures.

Although all of these procedures for adding the Group VI component are suitable for the purposes of this invention, it is presently preferred that impregnation, precipitation or comulling conditions be maintained such that the major proportion of the Group VI component is deposited outside the inner adsorption area of the zeolite, i.e., on the outer surface of the zeolite or on the amorphous oxide or both. Thus, it is desirable that less than 50 percent, preferably less than 20 percent, of the Group VI component be deposited within the inner adsorption area of the zeolite.

The Group IV components can be added to either the zeolite, the amorphous oxide or the combination thereof either before or after addition of the Group VI component by any one of several procedures. These alternatives include impregnation with solutions of soluble titanium or zirconium compounds, comulling with insoluble compounds in the presence or absence of water or other diluents, comulling with soluble compounds in the absence of sufficient water or other solvent to completely solubilize the Group IV component, and acidifying a solution of a soluble Group IV metal salt to precipitate the hydrous oxide.

Illustrative water soluble salts include the zirconyl and titanium chlorides, sulfates, acetates, and the like. Illustrative organically soluble compounds include zirconium tetrabromide, titanium tribromide, titanium dichloride, zirconium tetrachloride, and the like. Solutions of these compounds can be added to the zeolite or amorphous oxide to impregnate the support with a desired quantity of one or both of the Group IV metal components. In the alternative, the hydrous oxide can be precipitated from a solution of a metal salt by acidification with a relatively strong acid such as a strong mineral acid to a pH below about 4. Suitable acids include sulfuric, hydrochloric, nitric, phosphoric, and the like. Similarly, zirconium and titanium oxides can be acidified with strong mineral acids to form the corresponding salt which can then be used to impregnate the support or precipitate the hydrous oxide in the presence of a support as just described.

Basic soluble Group IV compounds can also be employed for either impregnation or comulling. The most prevalent of these include the peroxide complexes and carbonate complexes. Illustrative peroxide complexes include ammonium peroxotitanate, ammonium peroxozirconate, and the corresponding alkali and alkaline earth analogs. Relatively basic conditions corresponding to the pH levels above about 8 are generally preferred to maintain these compounds in solution. Thus, solutions of the peroxides can be employed to form these compositions under basic conditions. In the alternative, the basic solution can be acidified somewhat as by the addition of minor amounts of mineral or organic acids to reduce the pH below 8 and thereby precipitate the corresponding hydrous oxide in the presence of the catalyst support. The precipitate can also be formed by the addition of mild reducing agents such as formaldehyde.

The neutral carbonate complexes of zirconium and titanium can also be used for either impregnation, comulling or in situ precipitation. A variety of carbonate complexes of this nature are discussed in "Chemical Reviews," Vol. 70, No. 2, April, 1970. Illustrative of the carbonate complexes, which exist generally at pH levels of about 6 to about 10, are $(NH_4)_2[ZrO(CO_3)_2]\cdot 3H_2O$, $N_a[Zr(OH)_3CO_3]$, and analogs thereof having other cations such as the alkali and alkaline earth metal cations. These complexes can be obtained by forming an aqueous solution of a salt of titanium or zirconium such as zirconyl chloride or titanium sulfate and a carbonate such as ammonium, sodium, or magnesium carbonate, and digesting for a period sufficient to form the soluble complex at a pH between about 6 and about 10.

The use of neutral carbonate complexes is particularly useful for simultaneous addition of the Group IV and Group VI components. For example, molybdenum trioxide and zirconyl chloride can be dissolved in aqueous ammonium carbonate at a pH of about 8 to form the corresponding molybdenum and zirconium or titanium complexes. This solution can either be used to impregnate the support or can be acidified to precipitate molybdic or tungstic acid and the corresponding Group IV metal hydrous oxide in the presence of the support.

Alternatively, the Group IV component can be added by comulling soluble or insoluble zirconium or titanium compounds, e.g., zirconium oxide or titanium dioxide, usually in the presence of sufficient water to form a cohesive paste.

Even very minor amounts of the Group IV components improve physical and catalytic properties. As a general rule, however, sufficient amounts of the Group IV components should be present to provide at least about 0.1 equivalents of the Group IV metal per equivalent of Group VI metal. Thus Group IV concentrations are usually at least about 1, and preferably at least about 2, weight percent determined as the corresponding oxides.

The resulting combination is then preferably calcined in an oxidizing atmosphere at a temperature of at least about 600°F. However, the advantages of this invention are even more apparent when the catalysts are exposed to temperatures in excess of 800°F., particularly temperatures above 1,000°F., either in preparation, processing or regeneration. Thus, these compositions and methods are particularly useful when temperatures above about 800°F. are encountered. Calcination at these temperatures converts the Group IV component to the corresponding oxide and/or to a combination of the Group IV and Group VI metals such as titanium or zirconium molybdates or tungstates.

These compositions have utility in several processes. However they presently find their widest application in hydrogenative hydrocarbon conversion systems. These processes involve hydrocracking, hydrofining or hydrogenating a hydrocarbon feed with added hydrogen at elevated temperatures and pressures in the presence of the described catalyst. Feedstocks used in these processes usually boil above 300°F. However, hydrocracking systems generally employ feeds having initial boiling points of about 400°F or higher. These feeds can contain substantial amounts of organonitrogen and/or organosulfur compounds. Organonitrogen and organosulfur levels, particularly in hydrofiner feeds, usually exceed 20 ppm and are generally in excess of 100 ppm. Hydrofining involves reaction of the feed with added hydrogen at a pressure of at least 200 psig, generally about 500 to about 3,000 psig, and a temperature of at least about 500°F., usually at least about 600° to about 950°F., under a hydrogen partial pressure of at least about 100 psi. Hydrogen is usually added at a rate corresponding to about 500 to about 10,000 standard cubic feet per barrel of hydrocarbon feed. Reaction times generally correspond to liquid hourly space velocities on the order of 0.2 to about 10.

Similar conditions can be used to hydrogenate feeds containing olefinic or aromatic hydrocarbons. Typical hydrogenation feeds contain substantial amounts of atomatics, usually at least about 5 and often in excess of about 10 volume percent.

These procedures and the advantages of this invention are illustrated in part by the following examples.

EXAMPLE 1

A cobalt Y zeolite was prepared by slurrying 560 grams of ammonium zeolite Y in 500 ml of water, adding 500 ml 1.5M $CoCl_2$ and heating to boiling for one hour. The slurry was then filtered and washed and the exchange was repeated. Following the second exchange the zeolite was water-washed free of chloride and dried for 16 hours at 220°F.

The zeolite powder was mixed with 126 ml Ludox LS 30% silica sol. Then 36 ml 1.7M $Co(NO_3)_2$ was added as a coagulant. The paste was cast into 0.094 × 0.020-inch pellets, dried at 220°F. and calcined 2 hours at 600°F. The calcined pellets were immersed for one hour in 155 ml of 1.04M $(NH_4)_2MoO_4$. Then the pellets were drained, dried at 220°F. and recalcined 2 hours at 600°F. The remaining molybdate was added back to the dried pellets which were then redried and calcined at 900°F.

EXAMPLE 2

A titania gel was prepared by adding 25 ml 4M $TiCl_4$ solution to 250 ml 2.4N ammonium hydroxide. The gel was collected by filtration, washed free of chloride, and dried for two hours at 400°F. A 6.2 g portion of the dried gel was mulled with 100 g ammonium zeolite Y. The mulled powder mixture was slurried in 215 ml of 0.69M ammonium molybdate. The pH was adjusted to the interval 3.6–3.8 with nitric acid. After two days the solids were collected by filtration. The dissolved molybdenum was recovered by evaporating the filtrate and calcining the residue 2 hours at 700°F. The weight of the residue, 7.4 g, indicated that approximately 65% of the original molybdate had been adsorbed on the titania gel-zeolite mixture. The recovered molybdenum was combined with the catalyst by comulling. Nickel was exchanged into this combination by slurring with 62 ml 1.0M nickel nitrate, allowing to stand overnight, and filtering. The filter cake was dried, mixed with 115 ml Ludox LS 30% silica sol and 36 ml 1.7M nickel nitrate, cast into pellets, and calcined at 900°F.

EXAMPLE 3

The titania used in this example was formed in situ by concurrently adding solutions of titanium chloride and ammonium hydroxide to the zeolite slurry. The pH was consistently below the isoelectric point of titania during the adsorption of molybdenum. The specific procedure involved combining 100 g of ammonium zeolite Y, 370 ml of 0.2M $TiCl_4$ and sufficient 3N $NH_4OH$ to maintain the pH in the range of 3.5 to 3.9. The slurry was filtered and the residue was washed with water and slurried in 177 ml of 0.69M ammonium molybdate. The resulting mixture was aged two days at room temperature and filtered. The dissolved molybdenum was recovered by evaporating the filtrate and calcining the residue 2 hours at 700°F. The weight of residue, 2.3 g, indicated that approximately 87% of the original molybdate had been absorbed on the titania-zeolite combination. The recovered molybdenum was added back to the catalyst by mulling. The catalyst was then exchanged with 59 ml 1.0M nickel nitrate, allowed to stand overnight, and filtered. The filter cake was dried, mixed with 111 ml Ludox LS and 35 ml 1.7M nickel nitrate, cast into pellets, and calcined at 900°F.

EXAMPLE 4

A catalyst was made by concurrently adding titanium and molybdenum solutions to an aqueous zeolite slurry. The proportions were adjusted to keep the pH below 4.0. Higher pH levels tend to solubilize the molybdenum. The mixture was formed by adding 177 ml 0.69M ammonium heptamolybdate solution and 270 ml 0.2M $TiCl_4$ to 100 g of ammonium zeolite Y in 200 ml water. Sufficient 3N ammonium hydroxide was added to maintain the pH between 3.5 and 3.9. The mixture was then aged 2 days at room temperature and filtered. Dissolved molybdenum was recovered by evaporation calcining. The weight of residue, 2.8 g, indicated that approximately 85% of the original molybdate had been adsorbed or precipitated on the titania-zeolite combination. This residue was added back to the catalyst by comulling. Nickel was exchanged into the catalyst by slurrying with 50 ml 1.0M nickel nitrate and holding 16 hours before filtering. The filter cake was dried, mixed with 111 ml Ludox LS and 1.7M nickel nitrate, cast into pellets, and calcined at 900°F.

EXAMPLE 5

The catalyst of this example was made by alternate addition of titanium, molybdenum and zirconium. Ammonium zeolite Y (438 g) was slurried in 530 ml water. 980 ml 0.2M $TiCl_4$ solution was added concurrently with sufficient 3N ammonium hydroxide to maintain the pH between 3.5 and 3.9. The solids were collected by filtration, washed free of chlorides, and then slurried in 470 ml 0.69M ammonium heptamolybdate. 150 ml 0.2M $TiCl_4$ and 200 ml 1.0M zirconyl chloride was added concurrently with sufficient 3N ammonium hydroxide to maintain 3.5 to 3.9 pH. The dissolved molybdenum was recovered by filtering, evaporating the filtrate, and calcining the residue 2 hours at 700°F. The weight of the residue (3.2 g) indicated that approximately 93% of the molybdate had been adsorbed or precipitated on the titaniazirconia-zeolite combination. This residue was added back to the catalyst by comulling. The catalyst was next exchanged with nickel by slurrying with 160 ml 1.0M nickel nitrate, holding 16 hours and filtering. The filter cake was dried, mixed with 295 ml Ludox LS and 93 ml 1.7M nickel nitrate, cast into pellets, and calcined at 900°F.

EXAMPLE 6 – 10

Hydrogenation and hydrocracking activities for the catalysts of Example 1-5 were determined under identical conditions. The feed was a synthetic gas oil blend of tetralin and klearol (50–50 by volume) boiling between 400° and 812°F., having an API gravity of 24.6° and containing 1.0 weight percent sulfur. Test conditions were 650°F., 1,000 psig, 2.0 LHSV and 6,000 CF $H_2$/B. The results are summarized in Table 1.

TABLE 1

| Catalyst | 1 | 2 | 3 | 4 | 5 |
|---|---|---|---|---|---|
| Composition, Wt.% | | | | | |
| $MoO_3$ | 14.7 | 12.7 | 11.0 | 10.4 | 9.3 |
| NiO |  | 6.5 | 5.8 | 5.9 | 4.0 |
| CoO | 5.8 | | | | |
| $TiO_2$ |  | 4.5 | 3.3 | 3.5 | 4.0 |
| $ZrO_2$ |  |  |  |  | 5.6 |
| Performance | | | | | |
| Product °API | 32.4 | 34.7 | 38.5 | 40.3 | 41.8 |
| 400°F Conversion, Vol% ff | 40 | 51 | 59 | 62 | 73 |
| 400°F-Composition, Wt.% | | | | | |
| Aromatics | 42 | 42 | 31 | 28 | 25 |
| Saturates | 58 | 58 | 69 | 72 | 75 |

EXAMPLE 11

A molybdenum containing zeolite was prepared by impregnating the zeolite with an aqueous solution of ammonium heptamolybdate containing 0.288 g $MoO_3$ per ml. The zeolite was a nickel back-exchanged ammonium Y zeolite having a crystallinity relative to a laboratory standard of 105 percent, a surface area of 901 square meters per gram, a sodium content of 1.9 weight percent $Na_2O$, and a nickel content of 5.2 percent NiO. The zeolite was dried at a temperature of 600°F for 1 hour prior to impregnation. The finished product contained 32 weight percent $MoO_3$.

EXAMPLE 12

The nickel back-exchanged zeolite described in Example 11 was impregnated with sufficient aqueous ammonium tungstate containing 0.464 g $WO_3$ ml to incoporate 39 weight percent $WO_3$.

EXAMPLE 13

The nickel back-exchanged ammonium Y zeolite describd in Example 11 was thermally activated by steaming for 2 hours at 1,000 to 1,200°F., cooling, rehydrating, and then calcining for 1 hour at 1,400°F. The activated zeolite had a relative crystallinity of 84 percent and a surface area of 757 square meters per gram. This zeolite was then impregnated with ammonium heptamolybdate as described in Example 11. The finished composition contained 32 weight percent $MoO_3$.

EXAMPLE 14

The thermally activated zeolite of Example 13 was impregnated with ammonium tungstate by the procedure described in Example 12. The finished composition contained 37 weight percent $WO_3$.

EXAMPLE 15

The nickel back-exchanged ammonium Y zeolite described in Example 11 was dried at 600°F and combined with titanium and molybdenum by the following procedure. 0.1 moles of titanic acid was combined with 0.18 moles of molybdenum as ammonium heptamolybdate in 205 mls of water at a pH of 4. The resulting precipitate was collected by filtration and mulled with 50 grams of the nickel back-exchanged ammonium zeolite until a homogeneous mixture was obtained. The product contained 9 weight percent $TiO_2$ and 32 weight percent $MoO_3$.

EXAMPLE 16

A mixture of titania and tungsten was prepared by mixing 0.084 moles of titanic acid and 0.15 moles of ammonium tungstate in 186 milliliters of water. The precipitated product was collected by filtration and mulled with 50 grams of the ammonium zeolite to produce a homogeneous mixture. The product contained 37 weight percent $WO_3$ and 7.4 percent $TiO_2$.

EXAMPLE 17

The procedure described in Example 15 was employed to combine molybdenum and titanium with the thermally activated zeolite described in Example 13. The finished product contained 32 weight percent $MoO_3$ and 9 weight percent $TiO_2$.

EXAMPLE 18

The procedure described in Example 16 was repeated using the thermally activated zeolite described in Example 13. The final product contained 37 weight percent $WO_3$ and 7.4 weight percent $TiO_2$.

EXAMPLE 19

A zirconia-molybdena precipitate was formed by combining 52 ml of 1.0M $ZrOCl_2$ and 32 ml of 1.7M $MoO_3$, as ammonium heptamolybdate. The resulting wet product was collected by filtration and mulled with 25 grams of the nickel back-exchanged ammonium zeolite (pre-dried at 600°F). The final product contained 19 weight percent $MoO_3$ and 17 weight percent $ZrO_2$.

EXAMPLE 20

The procedure described in Example 19 was repeated using the thermally activated zeolite described in Example 13. The finished product contained the same relative amounts of molybdenum and zirconium as in Example 19.

EXAMPLES 21–32

The compositions of Examples 15 through 20 were divided into two portions. One part was calcined at 900°F., the other at 1,200°F. The acidity of the final product was determined with calcone and dicinnamalacetone (D—C—A) Hammett acidity indicators as described by A. E. Hirschler, Journal of Catalysis, Volume 2, 428 (1963) and H. A. Benesi, Journal of The American Chemical Society, Volume 78, 5490 (1956). The intensity of the reaction with each indicator was determined by visual inspection. These results are summarized in Table 2.

TABLE 2

| Zeolite | Hammett Acidity | | | |
|---|---|---|---|---|
| | Calcined at 900°F | | Calcined at 1200°F | |
| | Chalcone | D-C-A | Chalcone | D-C-A |
| Ni-NH$_4$-Y | S | S | S | S |
| Ni-H-Y | S | S | S | S |
| Ex. 11 | None | None | None | None |
| Ex. 12 | None | None | None | None |
| Ex. 13 | Weak | Weak | None | None |
| Ex. 14 | S | S | Weak | Weak |
| Ex. 15 | S | S | S | S |
| Ex. 16 | S | S | S | S |
| Ex. 17 | S | S | S | S |
| Ex. 18 | S | S | S | S |
| Ex. 19 | S | S | S | S |
| Ex. 20 | S | S | Weak | S |

S indicates strong reaction with indicator.

EXAMPLES 33–42

The thermal stability of the impregnated compositions and the effect of temperature on crystallinity and surface area were determined by treating two separate portions of each composition for 2 hours at 220°F or 1,200°F. Product crystallinity was determined by X-ray diffraction and comparison of the diffraction intensity to a laboratory standard. Surface area was determined by nitrogen sorption. The results of these investigations are summarized in Table 3.

TABLE 3

| Zeolite | Relative Cryst.,% | | S.A., $M^2/g^{(a)}$ | |
|---|---|---|---|---|
| | 220°F | 1200°F | 220°F | 1200°F |
| Ni-NH$_4$-Y | 105 | 65 | 901 | |
| Ni-H-Y | 84 | 52 | 757 | 665 |
| Ex. 11 | 34 | 0 | 495 | 6 |
| Ex. 12 | n a | n a | 488 | 310 |
| Ex. 13 | 21 | 0 | 356 | 29 |
| Ex. 15 | 46 | 33 | 513 | 320 |
| Ex. 17 | 44 | 30 | 536 | 471 |
| Ex. 18 | 46 | 22 | 490 | 454 |
| Ex. 19 | 69 | 43 | 765 | 310 |
| Ex. 20 | — | 61 | — | 556 |

$^{(a)}$ prior to nitrogen sorption all samples were dried to equilibrium at 750°F.

EXAMPLES 43–47

Ion exchange capacity retention as a function of calcination temperature was determined after treating separate portions of several of these zeolites at 220°F and 1,200°F. After calcination each sample was exchanged three times with 6.0 ml of 1.0M NaCl solution per gram of sample per exchange at 80° to 90°C. The exchange slurries were agitated 30 minutes in a mechanical shaker. The samples were then water washed free of chloride prior to analysis. The increase in zeolite sodium content accompanying this procedure was taken as an indication of exchange capacity. Exchange capacity was calculated according to the relationship:

$$Meq/g = 1,000\ (\%Na_2O)/(31)(100 - \%Na_2O),$$

where $\%Na_2O$ is the net sodium added by exchange. These results are summarized in Table 4.

TABLE 4

| Ex. No. | Calcination Temp., °F | Sodium Content, % $Na_2O$ | | | Capacity, Meq/g |
|---|---|---|---|---|---|
| | | Original | Exchanged | Added | |
| 11 | 220 | 1.2 | 9.1 | 7.9 | 2.8 |
| | 1200 | 1.2 | 1.6 | 0.4 | 0.1 |
| 12 | 220 | 1.1 | 8.5 | 7.4 | 2.6 |
| | 1200 | 1.1 | 3.2 | 2.1 | 0.7 |
| 13 | 220 | 1.2 | 4.2 | 3.0 | 1.0 |
| | 1200 | 1.2 | 1.2 | 0.0 | 0.0 |
| 15 | 220 | 1.2 | 7.4 | 6.2 | 2.1 |
| | 1200 | 1.2 | 3.1 | 1.9 | 0.6 |
| 19 | 220 | 1.5 | 9.4 | 7.9 | 2.8 |
| | 1200 | 1.5 | 6.5 | 5.0 | 1.7 |

EXAMPLE 48

The nickel ammonium zeolite Y described in Example 11 was mixed with powdered molybdenum trioxide and sufficient water and nitric acid to form a 30% slurry at a pH of 3.0. The slurry was evaporated to dryness with agitation at 220°F. Two separate portions of this product containing 20 weight percent $MoO_3$ were thermally treated for two hours at 900°F and 1,200°F respectively. The acidity and relative crystallinity of each of these products were then determined by Hammett indicators and X-ray diffraction as previously described. The results are summarized in Table 5.

EXAMPLE 49

The operation of Example 48 was repeated with the exception that the slurry pH was initially adjusted to 6.0 by the addition of $NH_4OH$. Two separate portions of this product containing 20 weight percent $MoO_3$ were calcined and analyzed as in Example 48.

EXAMPLE 50

The procedure described in Example 48 was repeated using the nickel ammonium zeolite Y and tungstic oxide. The finished product contained 32 weight percent $WO_3$. This material was calcined and analyzed as described in Example 48.

EXAMPLE 51

A second tungsten containing zeolite was prepared as described in Example 50 at a pH of 6.0. Two separate portions of the product were thermally activated and analyzed as in Example 48.

EXAMPLES 52-54

Examples 17-19 were repeated with the exception that the impregnating mixture pH was maintained at 7.5 rather than 4. The zeolites were calcined for 2 hours at 1,200°F and analyzed with Hammet indicators and by X-ray diffraction to determine acidity and relative crystallinity.

The results of Examples 48 through 54 and comparison of those results to the products of Examples 17 through 19 are summarized in Table 5.

TABLE 5

| No. | Ex. Composition | pH | Calcine Temp.,°F | Hammett Acidity Calcone | Hammett Acidity D-C-A | Rel. Crystl.,% |
|---|---|---|---|---|---|---|
| 48 | 20% $MoO_3$ | 3.0 | 900 | S | S | n a |
|  |  |  | 1200 | none | none | 0 |
| 49 | 20% $MoO_3$ | 6.0 | 900 | none | S | n a |
|  |  |  | 1200 | none | none | 0 |
| 50 | 32% $WO_3$ | 3.0 | 900 | S | S | n a |
|  |  |  | 1200 | none | weak | 0 |
| 51 | 32% $WO_3$ | 6.0 | 900 | S | S | n a |
|  |  |  | 1200 | none | none | 0 |
| 17 | 32% $MoO_3$,9% $TiO_2$ | 4 | 1200 | S | S | 30 |
| 52 | 32% $MoO_3$,9% $TiO_2$ | 7.5 | 1200 | S | S | 39 |
| 18 | 37% $WO_3$,7% $TiO_2$ | 4 | 1200 | S | S | 22 |
| 53 | 37% $WO_3$,7% $TiO_2$ | 7.5 | 1200 | S | S | 30 |
| 19 | 19% $MoO_3$,17% $ZrO_2$ | 4 | 1200 | S | S | 43 |
| 54 | 19% $MoO_3$,17% $ZrO_2$ | 7.5 | 1200 | S | S | 60 |

I claim:

1. The catalytic composition containing a crystalline aluminosilicate zeolite, a Group VI metal component selected from the group consisting of tungsten and molybdenum metals, oxides and sulfides, and a stabilizing amount of a stabilizing component comprising a Group IV metal selected from the group consisting of titanium and zirconium.

2. The composition of claim 1 wherein said zeolite is selected from zeolites having crystal structures characteristic of zeolites A, L, T, Omega and faujasite, said composition contains at least about 5 weight-percent of said Group VI component determined as a corresponding oxide and at least about 0.1 equivalents of said Group IV metal per equivalent of said Group VI component based on the respective metals.

3. The composition of claim 1 containing at least about 5 weight-percent of said Group VI component as the oxide or sulfide and at least about 1 weight-percent of said stabilizing component determined as the corresponding Group IV metal oxide.

4. The composition of claim 3 wherein said zeolite comprises faujasite containing less than 2 weight-percent $Na_2O$, and said composition comprises an amorphous refractory oxide and at least about 1 weight-percent of said stabilizing component determined as the corresponding Group IV metal oxide.

5. A composition as defined in claim 1 wherein said zeolite is a Y zeolite containing less than about 2 weight-percent $Na_2O$ and said catalytic composition also comprises a catalytic proportion of a nickel hydrogenating component.

* * * * *